Oct. 7, 1969  H. F. HODDER  3,471,678
ARC WELDER
Filed March 21, 1966  2 Sheets-Sheet 2
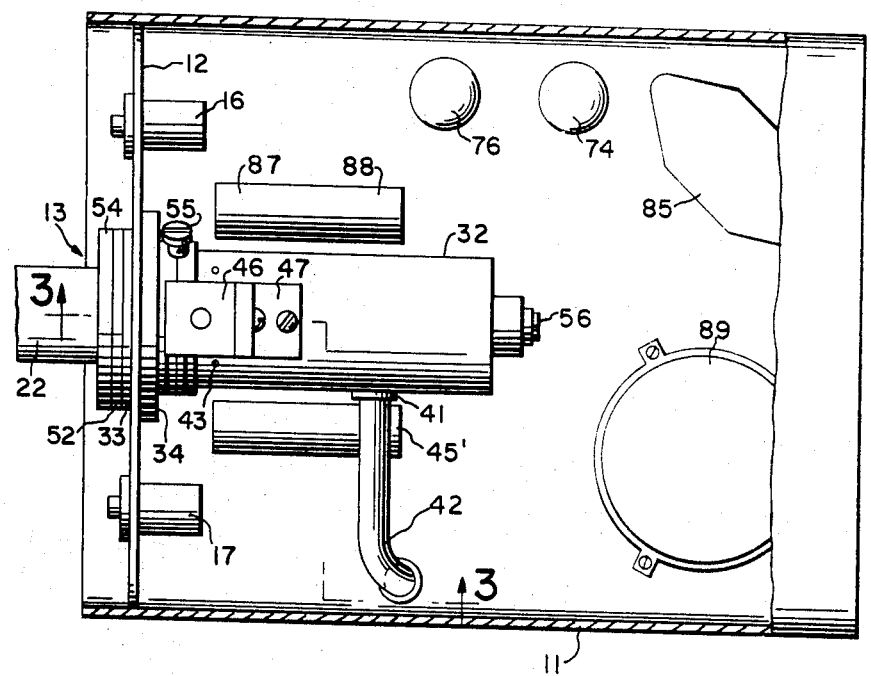
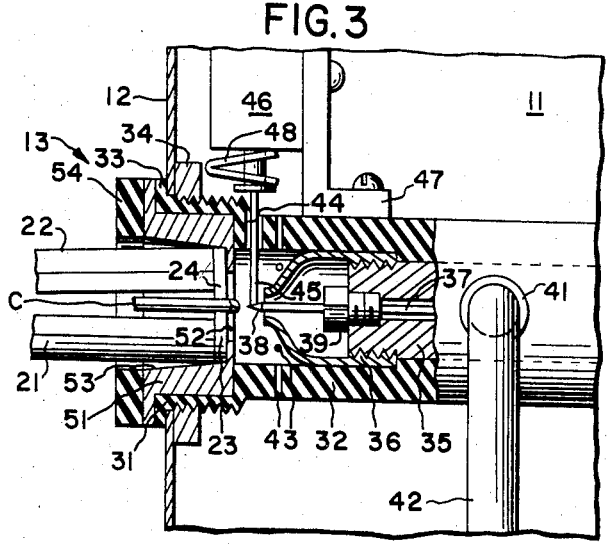
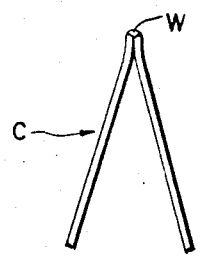
INVENTOR.
HAROLD F. HODDER

United States Patent Office 3,471,678
Patented Oct. 7, 1969

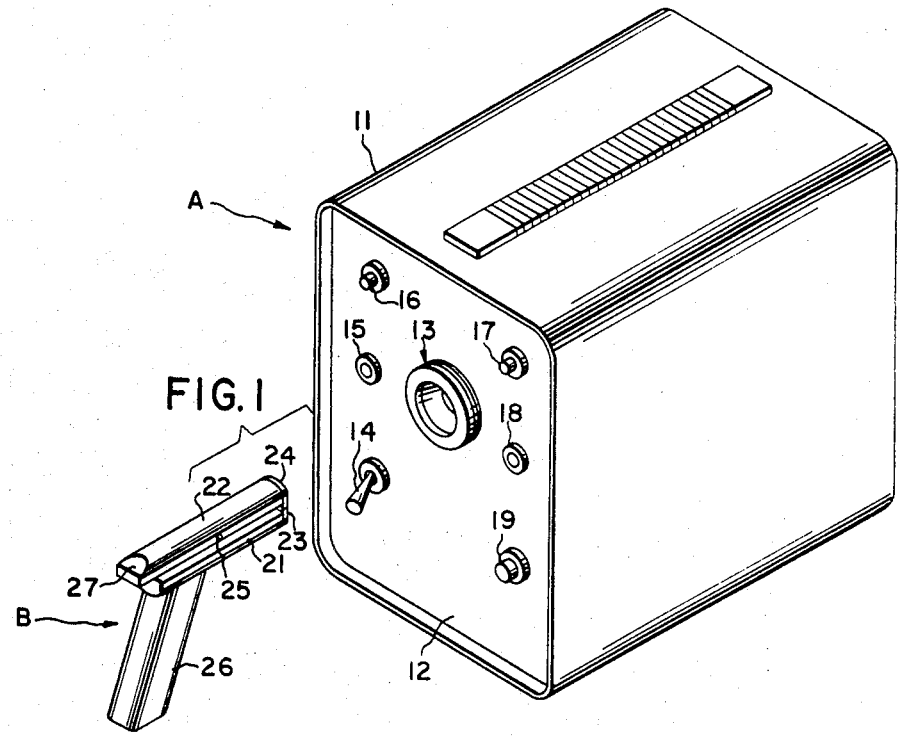
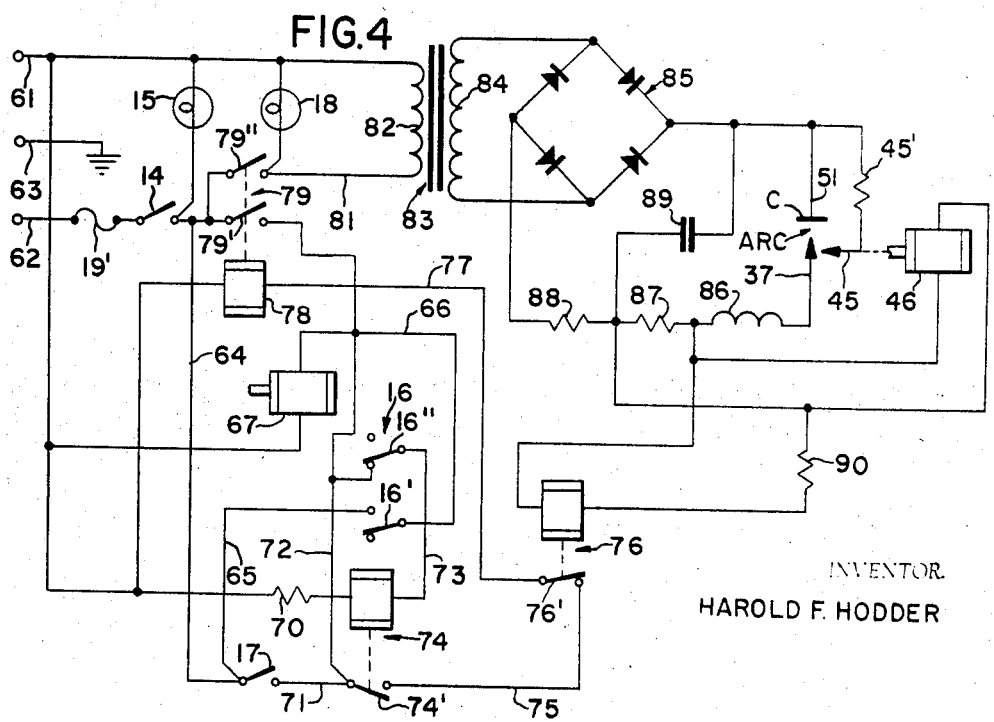

3,471,678
ARC WELDER
Harold F. Hodder, 3553 Elmhurst Ave.,
Santa Clara, Calif. 95051
Continuation-in-part of application Ser. No. 446,568,
Apr. 8, 1965. This application Mar. 21, 1966, Ser.
No. 539,252
(Filed under Rule 47(b) and 35 U.S.C. 118)
Int. Cl. B23k 9/00, 9/16, 9/24
U.S. Cl. 219—130
6 Claims

ABSTRACT OF THE DISCLOSURE

An arc welder has an apertured housing for receiving a work holder. A work holder adapted to hold work to be welded is removably mounted in said aperture and engages a work holder contact in the housing. A work electrode is mounted in the housing adjacent the aperture and is insulated from the contact so that the work is spaced a given distance from the work electrode. The welder also includes a circuit connected between the contact and the work electrode for establishing current and voltage to produce an arc between the work electrode and the work.

---

This application is a continuation-in-part of my copending application Ser. No. 446,568, filed Apr. 8, 1965, now abandoned.

The present invention relates in general to arc welders in which the work pieces to be welded are conveniently applied to the welder and a weld is readily accomplished by use of an arc struck onto the work pieces.

Broadly stated, the present invention, to be described in greater detail below, is directed to an inert gas arc welder having a housing provided with a work holder contact member and within which is supported a work electrode and electrical elements in circuit between the work holder contact member and the work electrode for establishing current and voltage to produce an arc between the work electrode and the work pieces. This construction provides an assembly into which various different types of work members such as, for example, thermocouple wires can be inserted for producing a desired bond or junction therebetween. This construction also automatically properly positions the work pieces with respect to the work electrode for establishment of the arc therebetween so that the actuation of the welding cycle can be accomplished by depressing a single switch.

In accordance with another aspect of the present invention a starting electrode is provided for initiating the welding arc. This starting electrode is initially placed in contact with the work electrode, and means such as a solenoid is provided for moving the starting electrode away from the work electrode a sufficient distance so that a short arc is initially established between the work electrode and starting electrode. Flow of the inert gas along the work electrode and toward the work pieces then transfers the arc from the starting electrode to the work pieces to produce the desired arc weld. With this construction initiation of the welding arc is assured without bringing the work pieces into contact with the work electrode. At the same time, the arrangement avoids the use of excessive voltage or other high frequency arc to initiate the welding arc.

In accordance with still another aspect of the present invention, movement of the starting electrode is controlled such as by provision of the starting electrode solenoid in the arc circuit and a bias spring to return the starting electrode into contact with the work electrode when no arc exists therebetween. This construction assures starting of the arc and also provides a safety feature to guard against undesired voltage discharges. Specifically, when the starting electrode initially moves away from the work electrode, if the arc is not established, the starting electrode will return to the work electrode or jitter against the work electrode until the arc is established. Furthermore, when the weld is completed, the return of the starting electrode to the work electrode serves to drain off any residual electric charge on the work electrode, thereby protecting personnel working with the device from high voltage electrical shocks.

In accordance with still another aspect of the present invention, if the inert gas is confined in its travel along the length of the work electrode and further confined as it approaches the work piece, a uniform stable arc is accomplished. In accordance with this aspect of the present invention, the circuit for establishing the arc is arranged to discharge the current and voltage across the arc electrodes during only the latter portion of the period of inert gas flow whereby contaminants are purged from the region of the welding electrode by the inert gas before initiation of the arc so that an uncontaminated weld is assured.

Other objects and advantages of this invention will become apparent upon reading the following description and referring to the accompanying drawing in which similar characters of reference represent corresponding parts in each of the several views.

In the drawings:

FIG. 1 is a perspective view of the apparatus in accordance with the present invention with the work holder exploded from its operative position;

FIG. 2 is a top view partially broken away of the apparatus in accordance with the present invention in operational condition;

FIG. 3 is a side sectional view, partially in elevation, of a portion of the structure shown in FIG. 2 taken along line 3—3 in the direction of the arrows;

FIG. 4 is a circuit diagram which illustrates the operation of the apparatus of the present invention; and FIG. 5 is an elevational view of two wires welded together by use of the device in accordance with this invention.

While the present invention is broadly directed to inert gas arc welding assemblies and apparatus for generating and establishing the arc for producing the welding, it is specifically applicable to structure for receiving and welding work pieces held in a work holder in welding position. Although the invention can be utilized for producing welds between members of various sizes, it is especially adaptable for providing a welded junction between wires such as thermocouple wires and for illustrative purposes will be described with respect to such an assembly.

Referring now to FIG. 1, there is illustrated a thermocouple arc welding assembly which includes a main body A in which the welding head assembly is housed and a work holder B for insertion into the container A and in which the work pieces C (FIG. 3) are held in position to be welded.

The body A includes a housing 11 provided with a front panel 12 apertured at the welding head assembly 13. A main power switch 14 is provided for turning power on from a conventional alternating current source such as a standard wall plug, and a power light 15 such as a white light is positioned on the front panel 12 to indicate that the power is on. At the top of the panel push button switches 16 and 17 are provided. The switch 16 operates only the valve to a supply (not shown) of inert gas such as argon for purging the gas lines such as when the device is initially connected to the gas supply. Switch 17 operates the entire welding cycle which includes actuation of the inert gas valve as described in greater detail below. Also, on the front panel a pilot light 18, such as a red bulb, is provided to indicate when current is being supplied to the electrode, and a fuse holder 19 is provided for holding a fuse for the main power line.

The work holder B includes lower and upper jaw holders 21 and 22, respectively, which are provided on their front ends with lower and upper work clamping jaws 23 and 24 of electrically conductive material such as copper and between which the work pieces C are held for welding. In order to hold the work pieces, the jaw holders 21 and 22 are rotatably mounted on a pin 25 and spring biased by a spring (not shown) rearwardly of the pin 25 for clamping the jaws 23 and 24 together. The lower jaw holder 22 is mounted on a handle 26, and simple one-hand operation of the work holder B for insertion of the work pieces C therein can be accomplished by holding the handle 26 with the fingers of one hand and depressing the rear end top surface 27 of the upper jaw holder 22 to open the clamping jaws 23 and 24.

Reference is now made to FIGS. 2 and 3 for a more detailed description of the welding head assembly 13. As illustrated, an insulator sleeve 32 such as of phenolic with a stepped diameter bore extends inwardly of the housing 11 through an aperture 31 in the front panel 12 and is held against the front panel by a flange 33 on the forward end of the sleeve 32 and a threaded ring 34 screwed onto external threads of the sleeve immediately inside the housing.

A hollow metallic electrode holder 35 such as of brass and provided with an inwardly tapering forwardly projecting shroud 36 is positioned at the smallest diameter step within the sleeve 32. A work electrode 37 of, for example, tungsten with a tapered front work end 38 is held within the bore of the electrode holder 35 by a slotted collet 39 such as, for example, brass threaded into the forward end of the bore of the electrode holder 35 within the shroud 36. The electrode holder 35 is held within the insulator sleeve 32 by means of a gas coupling 41 which is connected to a gas tube 42 through which an inert gas such as argon is conveyed into the bore of the electrode holder 35, along the work electrode 37, within the shroud 36 and through the opening at the front of the shroud 36 adjacent the work electrode end 38. Some of this inert gas flows forwardly from the work electrode 37 around and past the work pieces C while another portion of the inert gas flows radially outwardly of the insulator sleeve 32 via radial gas exhaust apertures 43. It has been discovered that this flow arrangement helps to produce a desirable stable arc.

Positioned in another radial tperture 44 in the sleeve 32 is a starting electrode 45 which is supported and movable from a position in contact with the front end 38 of the work electrode 37 radially away therefrom by means of a solenoid 46 mounted via a bracket 47 on the insulator sleeve 32. This starting electrode 45 is biased by a spring 48 against the action of the solenoid so as to contact the work electrode 37 before and after each welding cycle as will be described in greater detail below.

A metallic work holder contact cup 51, apertured in its bottom at 52 to permit location of the work C therein in front of the work electrode 37, is mounted in the forwardmost step in the diameter of the bore of the insulator sleeve 32. This contact cup is provided with an inwardly tapering bore 53 for centering the work holder B therein and is provided with an insulator ring 54 on its front exposed surface for preventing electric contact therewith by personnel operating the welding apparatus. The contact cup 51 is secured to the insulator sleeve 32 and provided with electrical communication with the other elements of the welding electrode circuit via a screw 55 (FIG. 2) which serves as a terminal post for a lead wire (not shown). Electrical potential is applied to the work electrode 37 through the collet 39 and electrode holder 35 from a lead wire (not shown) connected to a screw 56 in the rear end of the electrode holder 35. Other circuit elements are illustrated in FIG. 2 and shown in greater detail in the circuit diagram FIG. 4.

Referring now to FIG. 4, illustrating a circuit diagram of a typical embodiment of the present invention, power is provided from a typical alternating current source through power leads 61 and 62, and the case or housing 11 of the welding assembly is grounded via a ground wire 63. The main power switch 14 and a fuse 19' are provided in the power lead 62 so that upon closing main power switch 14 current is provided to the power light 15 and via line 64 to the weld push-button switch 17 and line 65 to the purge push-button switch 16. For operating only the purge cycle as desired to purge the inert gas line, the double-pole, double-throw, purge, push-button switch 16 is closed thereby providing power via throw 16' and line 66 to the solenoid 67 which opens a valve in the inert gas line 42. So long as the push-button switch 16 is depressed, gas will flow through the gas line, but open throw 16" of switch 16 prevents operation of the arc.

To operate the welding cycle the single-pole, single-throw, weld, push-button switch 17 is thrown to connect power from line 62 via lines 64, 71 and 72, throw 16" and line 73 through a time delay relay 74 to line 61. The time delay relay 74 closes a throw 74' to connect line 71 through line 75, the throw 76' of a normally closed time delay relay 76, line 77 and a relay 78 to line 61. The relay 78 controls a double-pole, double-throw switch 79 for supplying power from line 62 through one throw 79' to the argon supply control solenoid 67 and through the other throw 79" from line 62 to line 81 and the primary 82 of a transformer 83 as well as to the light 18.

The secondary 84 of the transformer 83 is connected to a bridge rectifier 85, one side of which is connected to the work holder contact cup 51 and the work C and returns via the arc to the work electrode 37 and thence to an initial surge inductance 86 and current limiting resistors 87 and 88 to the other side of the rectifier 85. A filter capacitor 89 is provided across the output of the bridge rectifier. The starting electrode solenoid 46 and the time delay relay 76 in series with a resistor 90 are connected across the resistor 87. In order to initiate the arc the starting electrode 45 is connected in series with a resistance 45' from the contact cup 51 toward the work electrode 37.

For operating the weld cycle with the work holder inserted in the contact cup 51, switch 17 is depressed to turn on the supply of inert gas, and after a predetermined length of time, such as 2 seconds, actuating time delay relay 74 operates to close the power switch 79. During this initial period inert gas is directed along the work electrode to purge the arc region and provide the inert gas for the arc to occur.

When the power switch has been closed power is delivered through the transformer to the arc electrodes. Then solenoid 46 moves the starting electrode 45 away from work electrode 37 to create an arc first between the work electrode 37 and the starting electrode 45 and then between the work electrode 36 and the work C in the work holder. After a predetermined length of time, such as on the order of ½ second, the time delay relay 76 opens the main line to the power switch 79 to cut off the arc. Due to the bias of spring 48 on the starting electrode 45, the starting electrode 45 is returned into contact with the work electrode 35 to drain off any charge remaining on capacitor 89 so that after the work holder is removed from the welding head assembly there is no danger of the person obtaining a shock from the end of the work electrode 37.

If no arc occurs upon initiation of the weld cycle by movement of the starting electrode 45 away from the work electrode 37, the starting electrode 45 due to spring bias will return to contact with the work electrode 37 and thus essentially jitter against the work electrode until an arc is generated.

The welding arc between the work electrode 37 and the work pieces C is developed by transfer of the pilot arc between the starting electrode 45 and the work electrode. Specifically, the stream of inert gas flowing to the left (FIG. 3) distorts the preliminary arc so that a portion thereof contacts the work pieces C. Since the work pieces and the work electrode 37 have opposite polarity (FIG. 4) an arc between these two elements, i.e. the welding arc, results from the gas flow. The resistor 45' limits the intensity of the pilot arc and thus prolongs the life of the starting electrode 45. The absence of such a resistor in series with the work pieces C provides a welding arc of greater intensity for a quick, complete weld of the work pieces. The voltage drop across the resistor 45' also aids in shifting from the pilot arc to the welding arc.

By forming the welding arc in this manner, I eliminate contamination of the work pieces which would result from contact with the work electrode 37 if the arc were initiated by direct contact. This is especially important in the fabrication of thermocouple junctions. The inert gas also prevents contamination by the constituents of the normal atmosphere, e.g. oxygen.

The flow rate of the inert gas may vary over a wide range for satisfactory operation. For example, with an opening of about 0.25 inch diameter in the shroud 36, a flow rate of 8 cubic feet per hour or more provides efficient operation; operation becomes marginal at around 5 cubic feet per minute. Laminar flow is highly desirable since substantial turbulence may prevent the local gas velocity in the arc region from having sufficient magnitude and direction of velocity for reliable operation.

FIG. 5 illustrates the weld W produced between two thermocouple wires which are illustrated as the work C placed within the work holder during a welding cycle. Naturally, the size of the arc welding machine can be varied to accomplish other welding functions while still incorporating the features and advantages of the present invention.

While it is believed that the above description is sufficient to teach a person skilled in the art to utilize the present invention, the following table is provided to give the operating parameters of the typical system as described above and embodying the invention.

TABLE I

| Element: | Rating | Manufacturer | Designation |
|---|---|---|---|
| 45 | 50 ohms, 25 w | | |
| 70 | 900 ohms, 10 w | | |
| 74 | | Amperite | 26NO2T. |
| 76 | | do | 6C2T. |
| 83 | 80 v. at 5 a | | |
| 85 | | Motorola | MDA5 962-3. |
| 86 | | Stancor Electronics | C-2685. |
| 87 and 88 | Adjustable 10 ohms, 25 w | | |
| 89 | 1,550 mfd., 150 v | | |
| 90 | 7.5 ohms, 25 w | | |

Obviously, instead of providing a separately operable weld cycle switch as described above the switch can be provided inside the work contact cup for actuation upon insertion of the work holder.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An arc welder comprising, in combination, a housing having an aperture for receiving a work holder therein; a work holder contact mounted in said housing aperture; a work electrode; means for mounting said work electrode within said housing adjacent said aperture and insulated from said contact, a work holder adapted to hold the work to be welded and for insertion into electrical engagement with said contact so that said work is spaced from said work electrode a desired distance; means in circuit between said contact and said work electrode for establishing current and voltage to produce an arc between said work electrode and said work when desired, and means for initiating an arc between said work electrode and said work.

2. The apparatus of claim 1 including a starting electrode, means for positioning a starting electrode in electrical contact with said end of said work electrode and means for moving said starting electrode away from said work electrode a sufficient distance so that an arc is initially generated between said work electrode and said starting electrode and transferred from said starting electrode to said work.

3. The apparatus of claim 1 characterized further in that said circuit means includes means for causing flow of inert gas in the region of said work electrode, said starting electrode and said work, said flow tending to divert toward said work the arc initially established between said work electrode and said starting electrode.

4. An inert gas arc welder comprising, in combination, a housing having an aperture for receiving a work holder therein; a work holder contact cup mounted in said aperture and having an exposed front surface; an insulator ring covering said exposed front surface of said contact cup; a work electrode; means for mounting said work electrode within said housing adjacent said aperture and insulated from said contact cup; a work holder constructed to hold work pieces to be welded and for insertion into said contact cup for engagement therewith so that the work pieces are spaced from an end of said work electrode a given desired distance; a starting electrode; means for positioning said starting electrode in electrical contact with said end of said work electrode; means for moving said starting electrode away from said work electrode a sufficient distance so that an arc is initially established between said work electrode and said starting electrode; means for directing a flow of inert gas along said work electrode to said end thereof for a given period of time to divert said arc from said starting electrode to said work pieces; means in circuit between said contact cup and said work electrode for establishing current and voltage to produce said initial arc during only the latter portion of said given period; and means for returning said starting electrode into contact with said electrode when no arc exists.

5. The apparatus in claim 2 wherein said positioning means comprises a bias spring tending to maintain said starting electrode in engagement with said work electrode, and said moving means comprises a solenoid operable to pull said starting electrode away from said work electrode.

6. The apparatus of claim 3 characterized further in that said current and voltage are established after commencement of said gas flow.

References Cited

UNITED STATES PATENTS 2,516,037 7/1950 Williams _____ 219—131
3,004,189 10/1961 Giannini _____ 219—75 X ANTHONY BARTIS, Primary Examiner J. G. SMITH, Assistant Examiner U.S. Cl. X.R.

219—75